Figure 1:
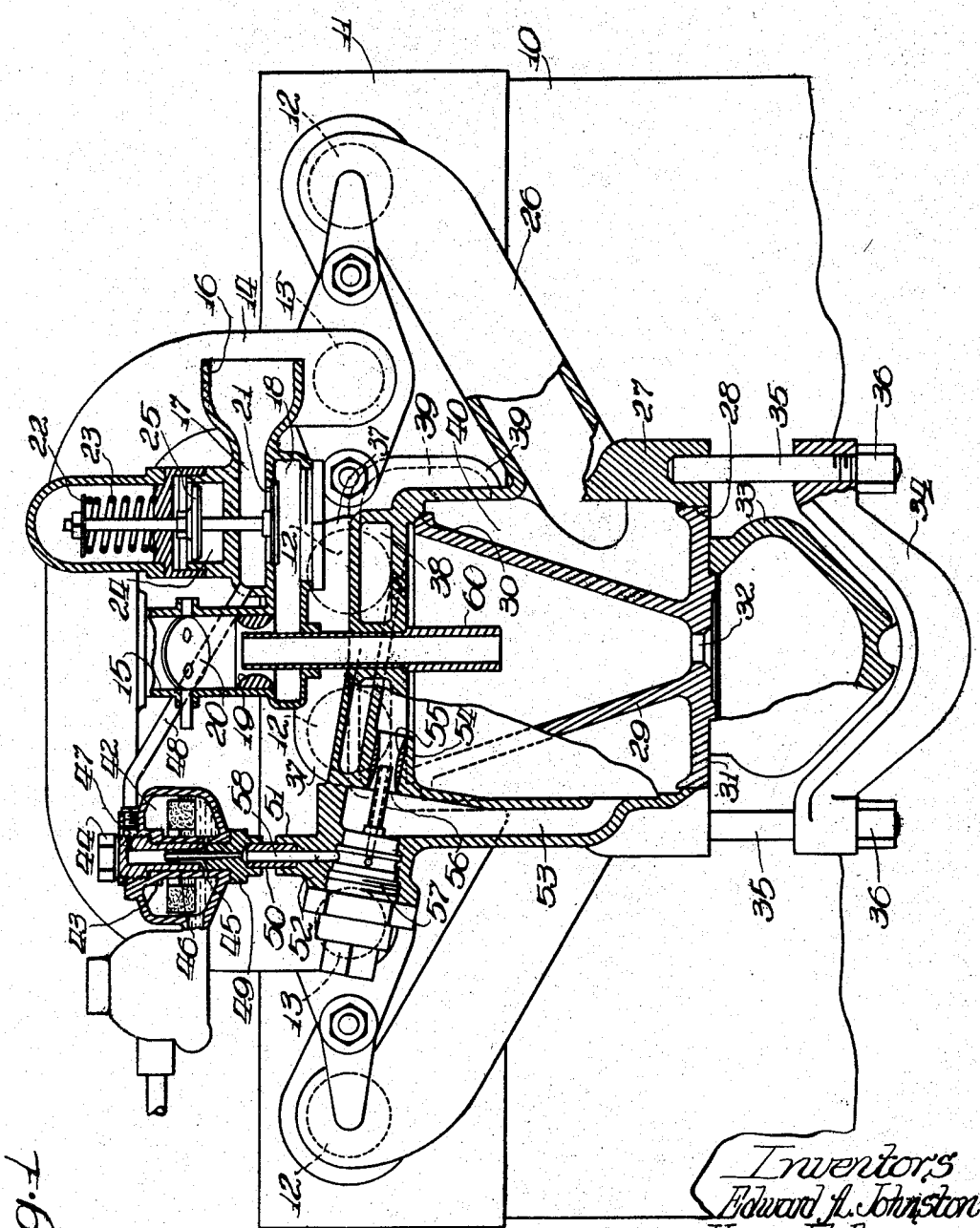

Jan. 21, 1936.  E. A. JOHNSTON ET AL  2,028,333
HEAVY FUEL VAPORIZER
Filed Oct. 16, 1933   2 Sheets-Sheet 1

Inventors
Edward A. Johnston
Harry F. Bryan
—and—
Harold H. Turner
By ... Atty

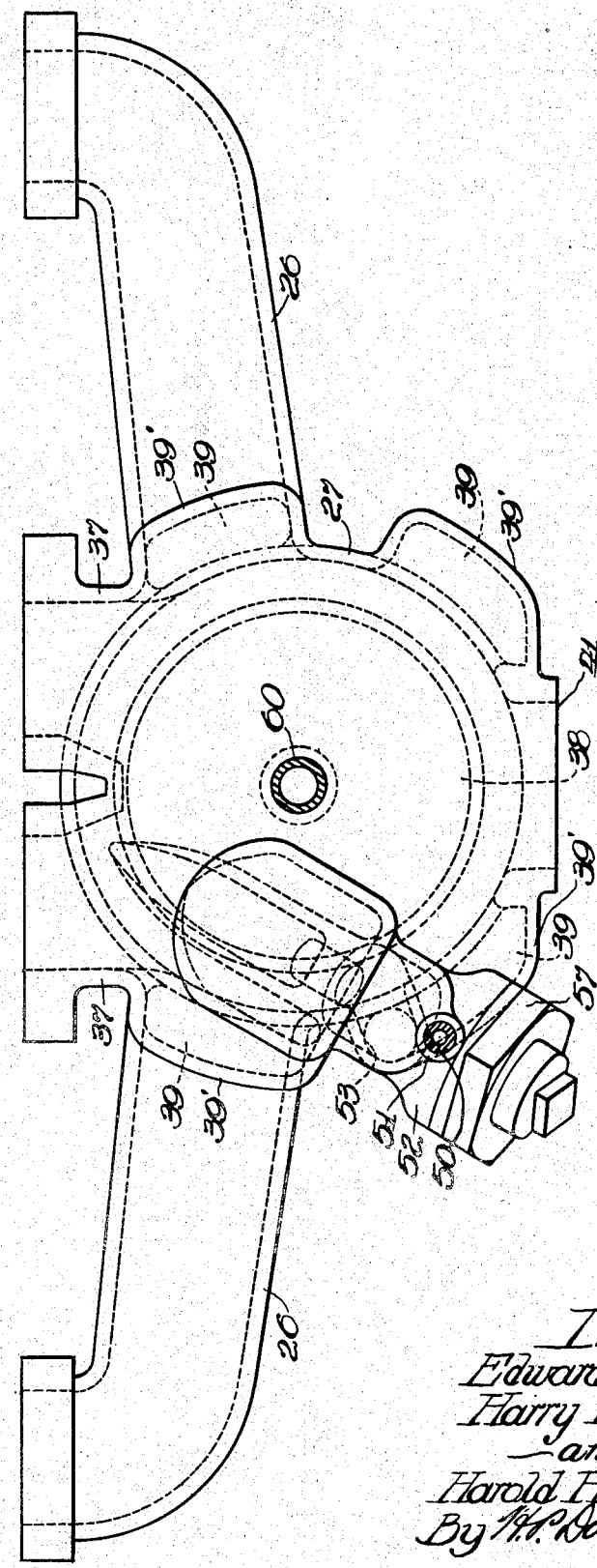

Patented Jan. 21, 1936

2,028,333

UNITED STATES PATENT OFFICE 2,028,333

HEAVY FUEL VAPORIZER

Edward A. Johnston, Harry F. Bryan, and Harold H. Turner, Chicago, Ill., assignors to International Harvester Company, a corporation of New Jersey Application October 16, 1933, Serial No. 693,726

9 Claims. (Cl. 261—12)

This invention relates to a charge-forming device for internal combustion engines. More specifically, it relates to an improved vaporizer and carburetor for handling fuel oils not adaptable for use in engines employing conventional carburetors.

In the operation of internal combustion engines, it is desirable to use the lowest grade fuel which can be satisfactorily handled by the charge-forming system of the engine. Ordinarily, gasoline or kerosene is used, these fuels being of sufficient volatility for carburetion directly with air, providing in the case of kerosene that hot-spotting or indirect heat is employed. However, the attempted use of any petroleum product appreciably less in volatility than kerosene has resulted in many difficulties. The principal difficulty is the cracking of the fuel oil with the formation of sludge, free carbon, coke, and other similar products. Another difficulty is encountered in metering the fuel and in forming a substantially homogeneous mixture at various load conditions of the engine and under varying temperature conditions.

The principal object of the present invention is to provide an improved fuel vaporizer and carburetor operable to handle low grade fuel with a minimum of the difficulties above pointed out. Another object is to provide an improved means of vaporizing by the use of both direct and indirect heating. Another object is to provide a fuel metering means automatically operated by conditions brought about by the load on the engine. Another object is to provide improved means for vaporizing by the sensible heat of hot products of combustion in the presence of sufficient air to maintain limited controlled combustion and vaporization.

The above objects and others, which will be apparent from the detailed description to follow, are accomplished by a device such as illustrated in the drawings, in which:—

Figure 1 is a side elevation of an engine and its manifolds with a portion of the charge-forming device broken away in section; and, Figure 2 is a top plan view of the exhaust manifold and the vaporizing casting formed integral with it, the dotted lines showing the inlet to the vaporizing chamber.

In the drawings, the outlines of the cylinder block 10 of an engine and the cylinder head 11 are shown. Said head is provided with four exhaust ports 12 and two inlet ports 13. An inlet manifold 14 communicates with the ports 13 and is provided with a centrally located inlet riser 15.

An air intake conduit 16 communicates through flattened overlapping passages 17 and 18 with the inlet end of the riser 15. A venturi 19 is positioned in the riser near the lower end, and a throttle valve 20 is mounted therein above the venturi.

In the wall dividing the passages 17 and 18, an opening is formed in which a poppet valve 21 is seated to open in the direction of the air flow. The stem of said valve is provided with an adjustable stop 22 at the upper end against which a light pressure spring 23 abuts. To prevent fluttering of the valve 21 with pulsating air flow, a dash-pot 24 is formed around the valve stem, in which a plunger 25 carried by the stem reciprocates. As illustrated, the air inlet 16, the passages 17 and 18, the riser 15, and the dash-pot 24 are formed in an integral casting. A cover is provided for the valve stem and spring, and means are provided for removing the valve.

As a substitute part for the regular exhaust manifold, a special manifold casting, incorporating integral therewith several elements of the present invention, is provided for mounting on the engine. From the two end exhaust ports 12, conduits 26 extend centrally downwardly and join with the main casing 27. Said casing is formed with a substantially cylindrical interior which has an opening 28 formed in the bottom.

A conical vaporizing chamber 29 is positioned in the casing 27 with a conical seat 30 around the larger upper end engaging a mating seat formed at the top of the casing. The bottom 31 of the chamber 29 is extended to form a circular cover plate for the bottom of the casing 27, fitting in the opening 28. At the lower end of the conical vaporizing chamber, an opening 32 is formed which communicates with an expansion and residue receiving chamber 33 secured to the bottom of the vaporizing chamber by a clamp bar 34. Said bar, which also holds the vaporizing chamber removably in position, is held in position by studs 35 secured to the casing 27 and nuts 36 threaded onto the studs. It is to be understood that the joints between the chamber 33 and the bottom of the vaporizing chamber 29 and between the vaporizing chamber and the casing 27 are constructed to be gas-tight against the escape of gases.

The two inner exhaust ports 12 communicate directly through short connections 37 with a flat annular compartment 38 cored into the top of the casing 27. As an outlet for the gases from said compartment, four cored passages 39 in enlargements 39' of the casing 27, extend around into the side wall of the casing forming communication between the compartment 38 and the annular heating jacket or space 40 formed by the wall of the casing and the conical wall of the chamber 29. The exhaust conduits 26 also communicate with the jacket 40, whereby all of the exhaust gas from all four ports is circulated around the vaporizing chamber 29. As shown in Figure 2, an outlet 41 is formed at the outer side of the casing 27 for the exhaust gases. This outlet and the inlets are so positioned as to obtain maximum and uniform heating of the vaporizing chamber.

To provide an outlet from the vaporizing chamber 29, a pipe 60 is positioned centrally of the top of the chamber extending down into the conical chamber a substantial distance. The upper end of said pipe extends through the bottom of the passage 18 into the throat of the venturi 19 for delivering thereto mixture from the chamber 29.

A conventional float chamber 42 is utilized to provide a supply of liquid fuel at a constant level, as indicated. In a center cylindrical member 43 of the float chamber a cylindrical fuel adjusting member 44 is threaded to variably cover fuel outlet orifices 45 formed below the liquid level in the member 43. An outlet tube 46 extends up into the hollow center of the member 44 above the normal liquid level whereby the fuel is delivered therethrough only upon a reduction in pressure therein. The hollow center of the member communicates, through a metered air bleed opening 47, with a balancing and air supply tube 48 connected to the passage 17 of the main air inlet.

The outlet tube 46 is fitted in a member 49 threaded into the bottom of the float chamber. A connecting tube 50 joins said member with a boss 51 formed on an extension 52 of the casing 27, which houses the portion of the charge-forming device to be hereinafter described.

A passage 53 cored in the extension 52 of the casing 27 communicates with the jacket 40 in a region where there is a minimum of pulsation due to exhaust discharges and with the top of the vaporizing chamber through a bore 54. As shown in Figure 1, said bore extends downwardly at a small angle with respect to the top of the vaporizing chamber. As shown in Figure 2, the bore is arranged near the outside of the large end of the vaporizing chamber and at a tangent thereto.

A venturi 55 is positioned in the bore 54 adjacent the vaporizing chamber. A fuel inlet tube 56, with its outlet end positioned in the throat of the venturi, is mounted in a member 57 threaded into a boss formed on the extension 52 of the casing. Through a conduit formed in the member 57, communication is provided between the tube 55 and a conduit 58 leading to the tube 50 communicating with the fuel supply through the member 49.

In the operation of the device as above described, the engine is preferably started on a good grade of volatile fuel, such as gasoline, which is very easy to form into a combustible mixture with air, even with a simple carburetor. Assuming that the engine has been operated on gasoline until fully warmed up, the fuel supply is then shifted over to a lower grade fuel, such as some of the poorer grades of distillate used for furnace oils. This charge-forming device is particularly designed to handle grades of fuel which cannot be handled by conventional carburetion systems using hot-spots or similar means for assisting in vaporization.

Suction produced in the riser 15, as controlled by the throttle valve 20, creates an air flow through the inlet 16, the passage 17, the air valve 21, the passage 18, and through the venturi 19, creating a low pressure area therein which is transmitted through the pipe 60 to the vaporizing chamber 29.

The exhaust pressure in the jacket 40 and the reduced pressure in the chamber 29 combined produce a resultant pressure differential which causes a flow of exhaust gas through the venturi 56. The suction produced in the throat of said venturi is transmitted through the tube 55, the conduit 58, and the tube 49, to the fuel inlet tube 46. As metered by the adjustable orifices 45 and the air bleed 47, an air-bled jet of fuel is thereby delivered to the venturi 56. The air-bled jet is a well known feature of carburetors to facilitate metering. The pipe 48, which communicates with the main air inlet, acts as a balancing means to take care of pressure changes in the air intake, such, for example, as variation in the air-cleaner resistance.

In the venturi 56 the air-bled fuel jet is sprayed into the stream of hot exhaust gas. The bore 54, into which the mixture is projected, is as short as possible and is shaped to avoid cooling areas which tend to produce condensation and carbon deposits. The mixture is projected tangentially and downwardly, and takes a spiral path around the conical wall, heated by the outside jacket 40. The top of the vaporizing chamber is also heated by the annular chamber which receives the exhaust gas from the two outer ports.

A certain amount of residue formed in the chamber 29 drops to the bottom and escapes through the opening 32 into the chamber 33. In actual operation, it has been found that this residue is not produced in any large amount and resembles mostly high temperature coke, being hard and granular. With continued operation some carbon deposit is also formed on the wall of the vaporizing chamber. Due, however, to the high velocity of the gases sweeping over the heated walls, there is very little accumulating deposit. The inert character of the hot exhaust gas, the sensible heat of which is utilized for vaporization, also accounts for the small amount of fuel cracking and subsequent carbon deposit. As previously stated, there is a small amount of air admitted with the fuel jet and also there is some oxygen in the exhaust gas. Although there is not sufficient air present to maintain a continued active combustion, results and temperature readings at different zones in the apparatus indicate that a certain amount of oxidation takes place in the vaporization chamber, maintaining the temperature higher than could be obtained by exhaust gases at the usual outlet temperatures. This action results in a more satisfactory vaporizing action and gives what has been designated as controlled vaporization.

The chamber 33 also has the important function of inhibiting the pulsations in the exhaust system, thereby stabilizing the pressure in the heating jacket 40 and assuring a more uniform flow of gas through the venturi 56.

The mixture from the vaporization chamber is drawn through the outlet pipe 60, mixed with air for proper combustion in the engine cylinders, and delivered to the inlet manifold at a rate governed by the throttle valve 20.

It will be noted that there is only one control,—the throttle valve 20,—for this charge-forming device. The fuel is metered by the air-bled fuel supply orifice. The ratio of vaporizing exhaust gas to the fuel is proportioned by the venturi 56 and by a resultant of the intake and exhaust pressures. The ratio between the vaporized fuel mixture and combustion air is controlled by the venturi 19. It has been found that with all of the elements properly proportioned and adjusted, the device supplies a substantially uniform and very efficient mixture over wide load and speed ranges of the engine. Very little difficulty is encountered with carbon deposits, and the construction of the device permits easy dismantling for inspection and removal of any such deposits.

Although applicants have shown and described only a preferred form of their improved charge-forming device, it is understood that they claim as their invention all modifications falling within the scope of the appended claims.

What is claimed is:

1. A heavy fuel vaporizer and carburetor for internal combustion engines comprising an intake manifold, an inlet to said manifold, throttling means in said inlet, a Venturi throat anterior to said means, an air inlet conduit communicating with said throat, a vaporizing chamber, an outlet conduit from said chamber communicating with a low pressure area in the Venturi throat, a heating jacket surrounding said chamber, means for supplying exhaust gas from the engine to said jacket, an inlet conduit communicating at one end with the chamber, means for supplying exhaust gas from the engine to the other end of said conduit at substantially the exhaust pressure, a Venturi throat in said conduit, a fuel supply, a conduit connecting said fuel supply with a low pressure area in said last mentioned Venturi throat, means for metering the fuel supplied to said conduit, and an air bleed communicating with said fuel supply.

2. A heavy fuel vaporizer and carburetor for internal combustion engines comprising an intake manifold, an inlet to said manifold, throttling means in said inlet, a Venturi throat anterior to said means, an air inlet conduit communicating with said throat, a conical vaporizing chamber, an outlet conduit from said chamber communicating with the low pressure area in the Venturi throat, an opening in the bottom of said chamber, a collecting and gas expansion chamber removably mounted over said opening, a heating jacket completely surrounding said chamber, means for supplying exhaust gas from the engine to said jacket, a vaporizing gas inlet conduit communicating at one end with the large end of the chamber at a tangent thereto, means for supplying exhaust gas from the engine to the other end of said conduit, a Venturi throat in said conduit, and means for supplying fuel to the low pressure area of said last mentioned Venturi throat.

3. A heavy fuel vaporizer and carburetor for internal combustion engines comprising an intake manifold, an inlet to said manifold, throttling means in said inlet, a Venturi throat anterior to said means, an air inlet conduit communicating with said throat, a conical vaporizing chamber, an outlet conduit from said chamber communicating with the low pressure area in the Venturi throat, an opening in the bottom of said chamber, a collecting and gas expansion chamber removably mounted over said opening, a heating jacket completely surrounding said chamber, means for supplying exhaust gas from the engine to said jacket, an inlet conduit communicating at one end with the large end of the chamber at a tangent thereto, means for supplying exhaust gas from the engine to the other end of said conduit, a Venturi throat in said conduit, a fuel supply, a metered conduit connecting said fuel supply with the low pressure area in said last mentioned Venturi throat, and an air bleed communicating with said fuel supply.

4. A heavy fuel vaporizer and carburetor for internal combustion engines comprising an intake manifold, an inlet to said manifold, throttling means in said inlet, a Venturi throat anterior to said means, an air inlet conduit communicating with said throat, a vaporizing chamber, an outlet conduit from said chamber communicating with a low pressure area in the Venturi throat, a heating jacket surrounding said chamber, means for supplying exhaust from the engine to said jacket, an inlet conduit communicating with the chamber, means for supplying exhaust gas from the engine at exhaust pressure to the other end of said conduit, a Venturi throat in said conduit, a fuel supply, a conduit connecting said fuel supply with a low pressure area in said last mentioned Venturi throat, means for metering the fuel supplied to said conduit, and an air bleed and balancing tube communicating with said fuel supply and with the air inlet.

5. A heavy fuel vaporizer and carburetor for internal combustion engines comprising an intake manifold, an inlet to said manifold, throttling means in said inlet, a Venturi throat anterior to said means, an air inlet conduit communicating with said throat, a conical vaporizing chamber, an outlet conduit from said chamber communicating with the low pressure area in the Venturi throat, a heating jacket completely surrounding said chamber, means for supplying exhaust gas from the engine to said jacket, a vaporizing gas inlet conduit communicating at one end with the large end of the chamber at a tangent thereto, means for supplying exhaust gas from the engine to the other end of said conduit, a Venturi throat in said conduit, and means for supplying fuel to the low pressure area of said last mentioned Venturi throat.

6. A heavy fuel vaporizer and carburetor for internal combustion engines comprising an inlet for combustible mixture, throttling means in said inlet, a Venturi throat anterior to said means, an air inlet conduit communicating with said throat, a vaporizing chamber, an outlet conduit from said chamber communicating with the low pressure area in the Venturi throat, a restricted opening in said chamber, a closed gas expansion chamber mounted over said opening, an inlet conduit communicating at one end with the vaporizing chamber, means for supplying exhaust gas to the other end of said conduit, a Venturi throat in said conduit, a fuel supply, and a metered conduit connecting said fuel supply with the low pressure area in said last mentioned Venturi throat.

7. A heavy fuel vaporizer and carburetor for internal combustion engines comprising an inlet for combustible mixture, throttling means in said inlet, a Venturi throat anterior to said means, an air inlet conduit communicating with said throat, a vaporizing chamber, an outlet conduit from said chamber communicating with the low pressure area in the Venturi throat, a restricted opening in said chamber at the bottom thereof, a closed gas expansion and residue collecting chamber mounted removably over said opening, an inlet conduit communicating with the chamber and with the engine exhaust, a Venturi throat in said conduit, a fuel supply, and a metered conduit connecting said fuel supply with the low pressure area in said last mentioned Venturi throat.

8. A heavy fuel vaporizer and carburetor for internal combustion engines comprising an intake manifold, an inlet to said manifold, throttling means in said inlet, a Venturi throat anterior to said means, an air inlet conduit communicating with said throat, a vaporizing chamber, an outlet conduit from said chamber communicating with the low pressure area in the Venturi throat, an opening in said chamber, a gas expansion chamber mounted over said opening, a heating jacket surrounding the vaporizing chamber, means for supplying exhaust gas from the engine to said jacket, an inlet conduit communicating at one end with the chamber at a tangent thereto, means for supplying exhaust gas to the other end of said conduit, a Venturi throat in said conduit, a fuel supply, a metered conduit connecting said fuel supply with the low pressure area in said last mentioned Venturi throat, and an air bleed communicating with said fuel supply.

9. A heavy fuel vaporizer and carburetor for internal combustion engines comprising an intake manifold, an inlet to said manifold, throttling means in said inlet, a Venturi throat anterior to said means, an air inlet conduit communicating with said throat, a vaporizing chamber, an outlet conduit from said chamber communicating with the low pressure area in the Venturi throat, an opening in the bottom of said chamber, a gas expansion and residue collecting chamber removably mounted over said opening, a heating jacket surrounding the vaporizing chamber, means for supplying exhaust gas from the engine to said jacket, an inlet conduit communicating at one end with the chamber at a tangent thereto, means for supplying exhaust gas to the other end of said conduit, a Venturi throat in said conduit, a fuel supply, a metered conduit connecting said fuel supply with the low pressure area in said last mentioned Venturi throat, and an air bleed communicating with said fuel supply.

EDWARD A. JOHNSTON.
HARRY F. BRYAN.
HAROLD H. TURNER.